United States Patent
Kagami et al.

(10) Patent No.: US 7,236,657 B2
(45) Date of Patent: Jun. 26, 2007

(54) OPTICAL SWITCH AND OPTICAL ADD/DROP MULTIPLEXER USING THE SAME

(75) Inventors: Kaoru Kagami, Tachikawa (JP);
Hidekuni Asai, Kunitachi (JP);
Yoshiatsu Yokoo, Hidaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/582,297

(22) Filed: Oct. 18, 2006

(65) Prior Publication Data
US 2007/0036481 A1 Feb. 15, 2007

Related U.S. Application Data

(62) Division of application No. 10/515,378, filed as application No. PCT/JP03/06386 on May 22, 2003, now Pat. No. 7,164,817.

(30) Foreign Application Priority Data
May 24, 2002 (JP) .............................. 2002-150083

(51) Int. Cl.
G02B 6/26 (2006.01)
G02B 6/42 (2006.01)
G02B 6/32 (2006.01)

(52) U.S. Cl. ............................ 385/16; 385/15; 385/19; 385/23; 385/31; 385/33; 385/34; 385/39; 385/50

(58) Field of Classification Search ................ 385/16
See application file for complete search history.

(56) References Cited

U.S. PATENT DOCUMENTS

| | | | |
|---|---|---|---|
| 4,859,022 A | 8/1989 | Opdahl et al. | |
| 4,874,218 A | 10/1989 | Bowen et al. | |
| 4,961,620 A | 10/1990 | Uken et al. | |
| 5,177,804 A | 1/1993 | Shimizu et al. | |
| 5,278,692 A | 1/1994 | Delapierre | |
| 5,343,541 A | 8/1994 | Uken et al. | |
| 5,436,986 A | 7/1995 | Tsai | |
| 5,612,815 A | 3/1997 | Labeye et al. | |
| 5,828,800 A | 10/1998 | Henry et al. | |
| 6,192,174 B1 | 2/2001 | Lee | |
| 6,347,168 B1 | 2/2002 | Shimomura et al. | |
| 6,393,174 B1 | 5/2002 | Karaguleff et al. | |
| 6,647,168 B2 | 11/2003 | Hsu et al. | |
| 6,807,331 B2 | 10/2004 | Hsu et al. | |
| 2001/0038734 A1 | 11/2001 | Kim et al. | |

(Continued)

FOREIGN PATENT DOCUMENTS

JP 59-185301 10/1984

(Continued)

*Primary Examiner*—Frank G. Font
*Assistant Examiner*—Ryan Lepisto
(74) *Attorney, Agent, or Firm*—Oliff & Berridge, PLC

(57) ABSTRACT

An optical switch easy to adjust optical parts without using a catoptric system and an optical add/drop multiplexer using the optical switch are provided. Between an input light outputting collimator device 20 and an output light inputting collimator device 21 provided to face each other at a predetermined spaced interval, a drop light inputting collimator device 22 and an add light outputting collimator device 23 fixed and held on a movable holding member 24a in common are moved forward and retreated, and thereby a switching is conducted.

6 Claims, 6 Drawing Sheets

U.S. PATENT DOCUMENTS

| | | |
|---|---|---|
| 2002/0041448 A1 | 4/2002 | Fukuzawa et al. |
| 2002/0064336 A1 | 5/2002 | Graves et al. |
| 2002/0181854 A1 | 12/2002 | Steinberg et al. |
| 2003/0048978 A1 | 3/2003 | Chen et al. |

FOREIGN PATENT DOCUMENTS

| | | |
|---|---|---|
| JP | A-02-43514 | 2/1990 |
| JP | 02-244105 | 9/1990 |
| JP | 04-237010 | 8/1992 |
| JP | 2599876 A | 1/1997 |
| JP | 2000-2843 A | 1/2000 |
| JP | 2000-183816 A | 6/2000 |
| JP | 2000-337765 A | 12/2000 |
| JP | 2001-133705 A | 5/2001 |
| WO | WO 99/14879 | 3/1999 |

OPTICAL SWITCH AND OPTICAL ADD/DROP MULTIPLEXER USING THE SAME

This is a Divisional of application Ser. No. 10/515,378, filed Feb. 28, 2005 now U.S. Pat. No.7,164,817, which in turn is a National Stage Application of PCT/JP03/06386, filed May 22, 2003. The entire disclosure of the prior applications are hereby incorporated by reference herein their entirety.

BACKGROUND

1. Technical Field

The present invention relates to an optical switch used for change of an optical path of a signal light or the like and an optical add/drop multiplexer using the optical switch in a field of optical communication or the like.

2. Background Art

In recent years, a development of a wavelength-division multiplexing system has been advancing in an optical communication system, and recently, an optical communication system has been drawing attention, which has an add/drop (Add/Drop Multiplexer: ADM) function to sort out and utilize only a signal light of a specific wavelength from among plural signal lights at a repeater station being provided in a middle of an optical transmission line, or to add and transmit other signals from this repeater station into the optical transmission line, in addition to perform a transmission/reception between two stations. A device disclosed in Japanese Patent Laid-open No. 2000-183816 is known as an optical add/drop multiplexer utilized in such an optical communication system.

The optical add/drop multiplexer includes an optical demultiplexer which receives a multiple wavelength light from the optical transmission line and demultiplexes it into signal lights of respective wavelengths, and an optical multiplexer which remultiplexes and transmits the signal lights demultiplexed into the respective wavelengths to the optical transmission line, and has two by two channel optical switches for switching optical paths of the signal lights to either (a) or (b) described below corresponding to the respective signal lights demultiplexed by the optical demultiplexer, between the optical demultiplexer and the optical multiplexer.

(a) transmits the signal lights straight to the optical transmission line without dropping them to the repeater station; and (b) drops the signal lights to the repeater station and simultaneously adds the signal lights transmitted from the repeater station to the optical, transmission line.

The multiple wavelength light inputted to such an optical add/drop multiplexer is firstly demultiplexed into the signal lights of the respective wavelengths by the optical demultiplexer. Further, the optical paths of the respective signal lights are selected to be either the aforementioned (a) or (b), by the optical switches provided in accordance with the signal lights of the respective wavelengths, and only the signal lights of the wavelengths used at the repeater station are dropped at the repeater station. The dropped signal lights are utilized at the repeater station, and the signal lights transmitted from the repeater station to be added to the optical transmission line are sent to the optical multiplexer via the optical switches. The signal lights of the respective wavelengths are remultiplexed at the optical multiplexer and sent to the optical transmission line as-the multiple wavelength light.

As the two by two channel optical switch used for the optical add/drop multiplexer, switches using prisms are conventionally known as disclosed in Japanese Patent Laid-open No. 2000-2843 and U.S. Pat. No. 5,436,986.

FIG. 12 shows a conventional optical switch 100 of the two by two channel using prisms. In the optical switch 100, an inputting optical fiber collimator 10 which inputs signals demultiplexed by the optical demultiplexer, and an outputting optical fiber collimator 11 which sends the signal lights to the optical multiplexer for multiplexing are provided to face each other at a predetermined spaced interval. On the other hand, a dropping optical fiber collimator 12 which drops the signal lights to a repeater station is disposed adjacent to the inputting optical fiber collimator 10, and an adding optical fiber collimator 13 which adds the signal lights from the repeater station is disposed adjacent to the outputting optical fiber collimator 11, and the dropping optical fiber collimator 12 and the adding optical fiber collimator 13 are also disposed to face each other at a predetermined spaced interval.

Furthermore, two right-angle prisms 14 and 15 are movably disposed in a predetermined spaced intervals formed between the facing two pairs of collimators. A switching of the above-described optical paths (a) or (b) is conducted by a movement of the prisms. In other words, when the prisms are placed at the positions shown by solid lines in the drawing, a light outputted from the inputting optical fiber collimator 10 is reflected by these prisms and inputted to the dropping optical fiber collimator 12, and a light added from the adding optical fiber collimator 13 is similarly reflected by these prisms and inputted to the outputting optical fiber collimator 11, and thereby, the optical path (b) is formed.

On the other hand, when the prisms are placed at retreat positions shown by dotted lines in the drawing, the signal light outputted from the inputting optical fiber collimator 10 is inputted to the outputting optical fiber collimator 11, and thereby the optical path (a) is formed.

Besides, as a similar two by two channel optical switch, a switch using a reflector instead of the prisms is generally known (for example, refer to Japanese Patent Laid-open No. 2001-133705). It is a switch which reflects an input light with the reflector by disposing the reflector movably between the outputting optical fiber collimator and the inputting optical fiber collimator so as to switch the optical path.

However, the aforementioned optical switches using the prisms or the reflector had problems described below. Conventional optical switches use a catoptric system, and a loss of lights at the time of reflection is inevitable when drop of the signal lights to the repeater station and addition of the signal light from the repeater station are conducted.

Besides, at the time of reflection, a light is reflected in an orthogonal direction by the prisms or the reflector, and a phenomenon (PDL: Polarization Dependence Loss) in which a loss is changed depending on a polarized wave of the light is inevitable when the light is thus reflected in an oblique direction. When such a PDL occurs, a bit error rate in the optical communication becomes high, and as a result, there is a problem of deterioration in the quality of the optical communication.

Furthermore, in the conventional optical switches, it is required to adjust the prisms or the reflector to the optical fiber collimators with high precision in addition to position adjustments between the optical fiber collimators. Especially, when the catoptric system such as the prisms, the reflector, or the like is used, axis deviation of the reflected light becomes large due to an angular misalignment of the prisms or a mirror, and therefore, there is a problem that the alignment of optical parts is difficult.

The present invention is made in order to solve the aforementioned problems, and it is an object of the present invention to provide an optical switch which does not use the catoptric system and easy for alignment. Furthermore, it is an object of the present invention to provide an optical add/drop multiplexer using this optical switch.

DISCLOSURE OF THE INVENTION

In order to solve the above-mentioned problems, a first means is:

An optical switch, being provided in a middle of an optical transmission line, which switches a light sent through this optical transmission line either to be transmitted straightly or to be sorted outside and simultaneously the light from outside is introduced and sent to the optical transmission line, the optical switch including:

an input light outputting collimator device which collimates and outputs a light sent through the optical transmission line;

an output light inputting collimator device which inputs the collimated light outputted from the input light outputting collimator device at a position away for a predetermined distance and introduces and sends the collimated light to the optical transmission line; and an optical switching portion retreatably disposed between the input light outputting collimator device and the output light inputting collimator device, wherein the optical switching portion includes a drop light inputting collimator device which inputs the collimated light outputted from the input light outputting collimator device, introduces the collimated light to a dropping transmission line, and sends the collimated light to outside when the optical switching portion is disposed between the input light outputting collimator device and the output light inputting collimator device, and an add light outputting collimator device which collimates and outputs a light sent from outside through an adding transmission line, and the collimated light is inputted to the output light inputting collimator device, and introduces the collimated light to an outputting transmission line.

A second means is:

the optical switch according to the first means, wherein the input light outputting collimator device, the output light inputting collimator device, the drop light inputting collimator device, and the add light outputting collimator device are optical fiber collimator devices.

A third means is:

the optical switch according to the first or the second means, wherein the optical switching portion forms a V-shaped groove on a movable holding member retreatably disposed between the input light outputting collimator device and the output light inputting collimator device, and fixes to hold the drop light inputting collimator device and the add light outputting collimator device on the V-shaped groove.

A fourth means is:

an optical add/drop multiplexer, includes:

an optical demultiplexer which demultiplexes a multiple wavelength light transmitted from an optical transmission line into signal lights of respective wavelengths;

an optical switch, being provided in accordance with the respective signal lights of the respective wavelengths demultiplexed at the optical demultiplexer, which switches optical paths of the signal lights of the respective wavelengths to either (a) a case of transmitting the Menial lights straight to the optical transmission line without dropping them to a repeater station, or (b) a case of dropping the signal lights to the repeater station and simultaneously adding the signal lights sent from the repeater station to the optical transmission line; and an optical multiplexer which multiplexes the signal lights added from the repeater station and the signal lights transmitted without being dropped to the repeater station in the optical switch to make a multiple wavelength light, wherein the optical switch according to any one of the first means to the third means is used as the optical switch.

SUMMARY

As explained above, according to the present invention, an optical switch can be obtained, in which an optical communication of high quality with small loss is possible because it is not necessary to use a catoptric system, and an alignment thereof is easy. Besides, an optical add/drop multiplexer capable of the optical communication of high quality using the optical switch can be obtained.

| | |
|---|---|
| 10 | inputting optical fiber collimator |
| 11 | outputting optical fiber collimator |
| 12 | dropping optical fiber collimator |
| 13 | adding optical fiber collimator |
| 20 | input light outputting collimator device |
| 21 | output light inputting collimator device |
| 22 | drop light inputting collimator device |
| 23 | add light outputting collimator device |

-continued

| | |
|---|---|
| 14, 15 | prism |
| 24 | optical switching portion |
| 24b | V-shaped groove |
| 31, 32 | optical transmission line |
| 33 | optical demultiplexer |
| 34 | optical multiplexer |
| 36 | transmitter |
| 37 | receiver |
| 100, 200 | optical switch |
| 300 | optical add/drop multiplexer |

DETAILED DESCRIPTION OF EMBODIMENTS

Figure 1:
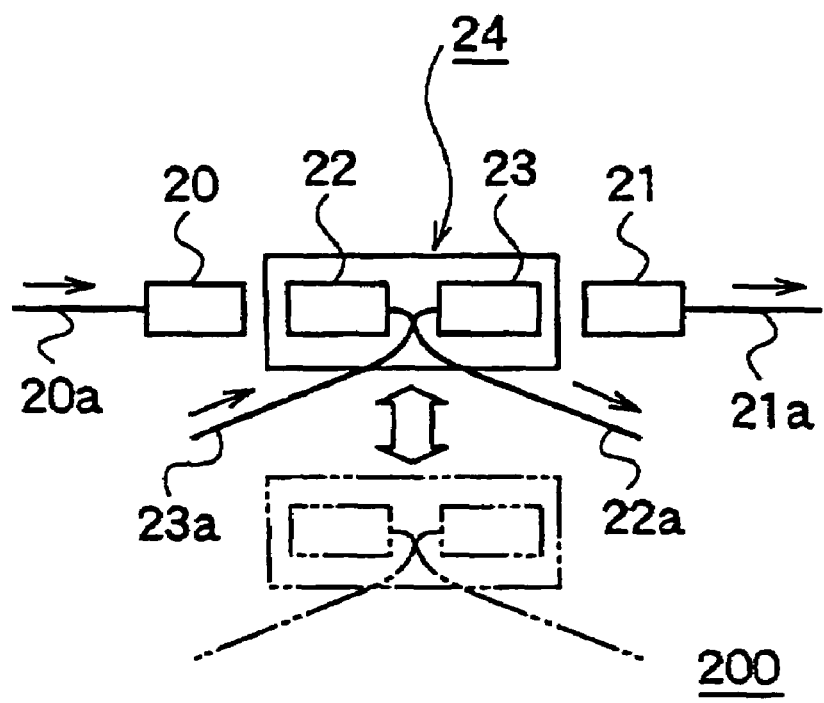
FIG. 1 is a plan view showing a structure of an optical switch 200 according to the present embodiment.
Figure 2:
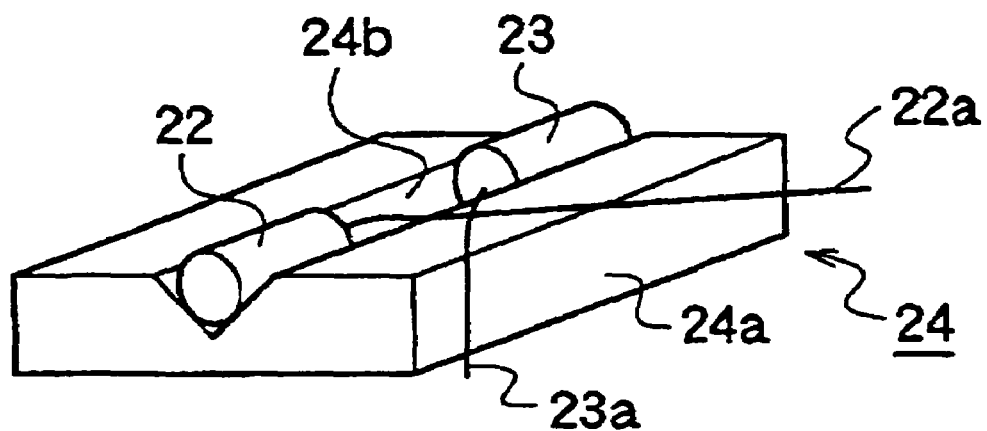
FIG. 2 is a perspective view showing an example of an optical switching portion 24.
Figure 3:
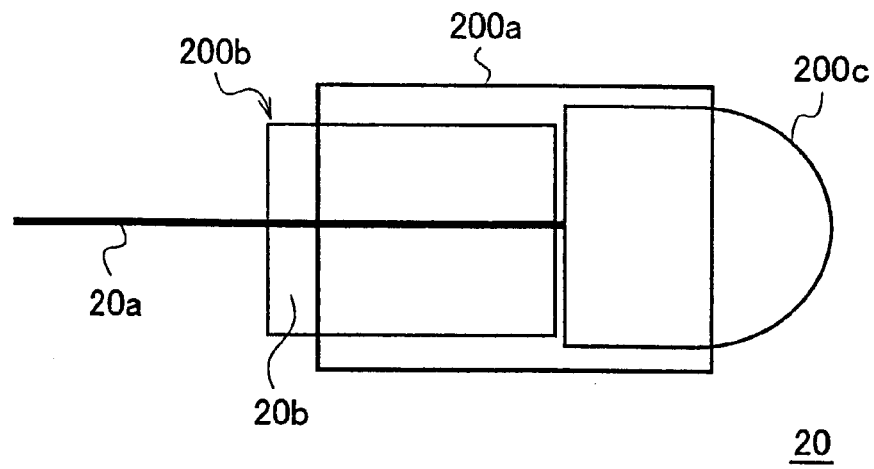
FIG. 3 is a view showing a concrete structure of an input light outputting collimator device 20.
Figure 4:
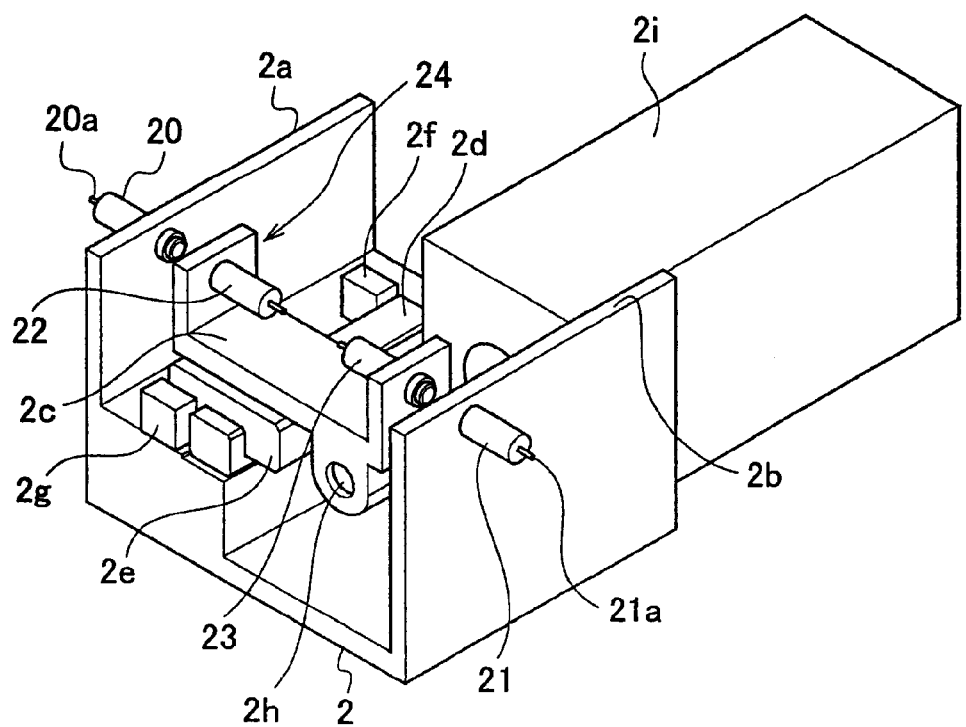
FIG. 4 is a perspective view showing a concrete structure of an optical switch according to an embodiment of the present invention.
Figure 5:
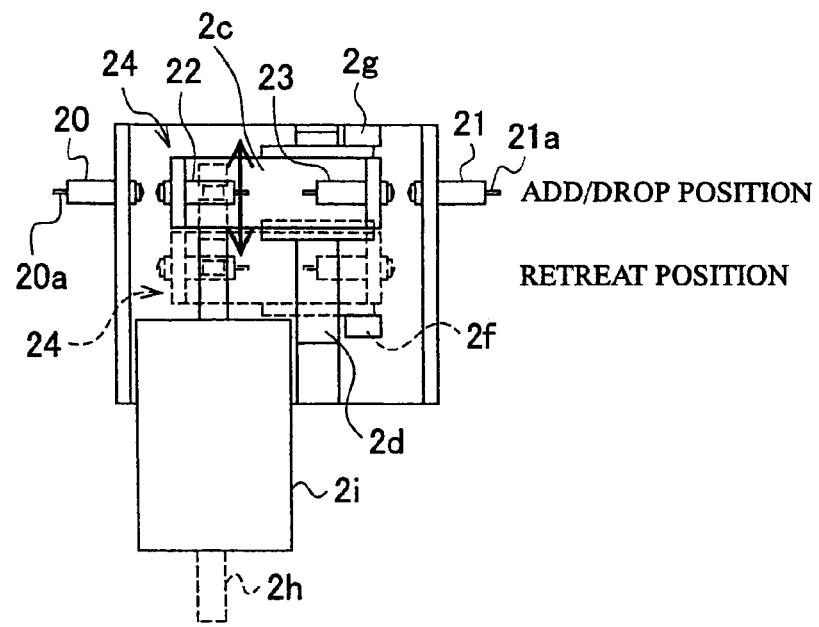
FIG. 5 is a plan view showing a concrete structure of the optical switch according to the embodiment of the present invention.
Figure 6:
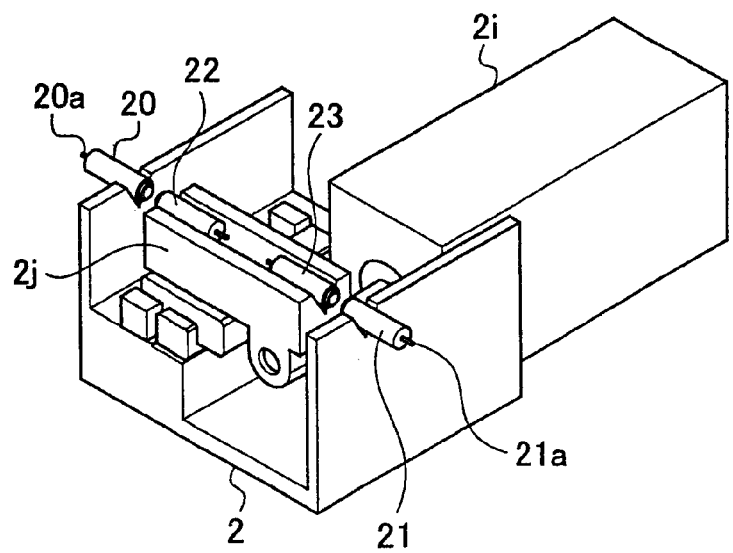
FIG. 6 is a perspective view showing a transformed example of the optical switch shown in FIG. 5.
Figure 7:
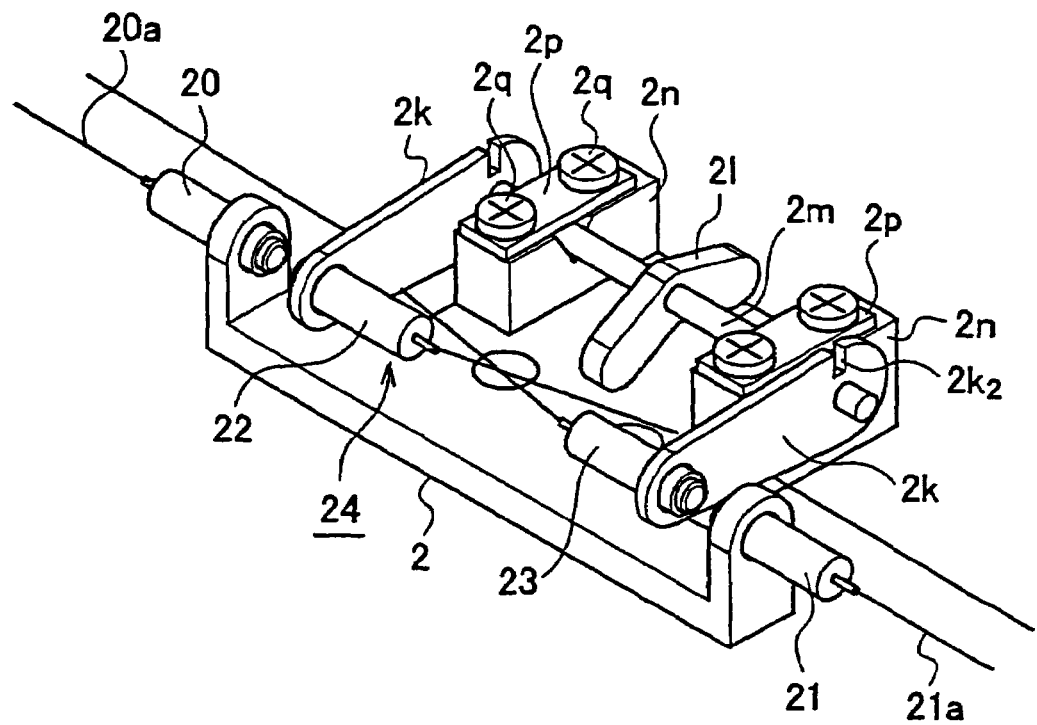
FIG. 7 is a perspective view showing another concrete structure of the optical switch according to the embodiment of the present invention.
Figure 8:
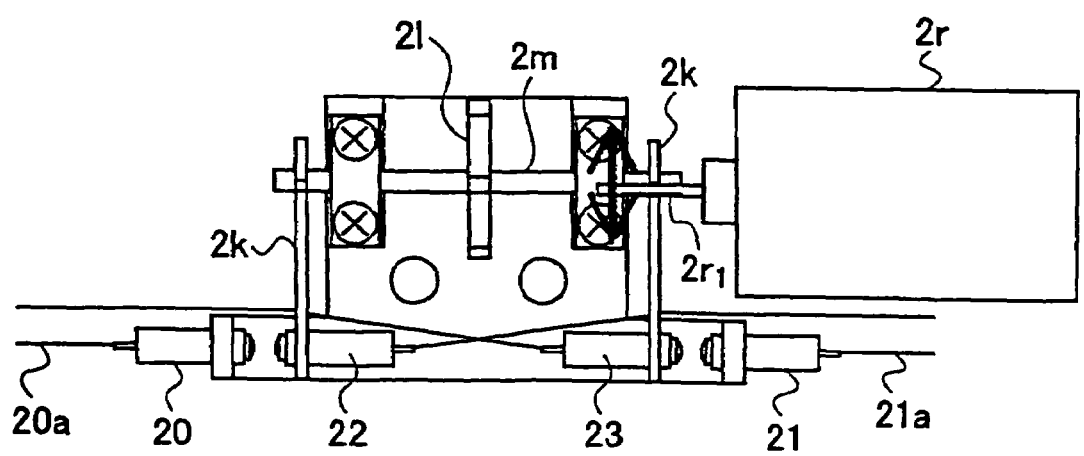
FIG. 8 is a plan view of the optical switch shown in FIG. 7.
Figure 9:
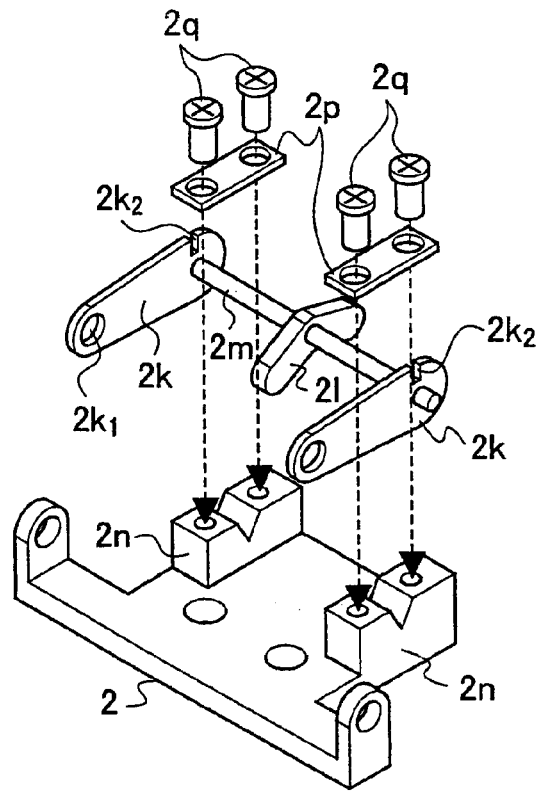
FIG. 9 is an explanatory view of the optical switch shown in FIG. 7 and FIG. 8.
Figure 10:
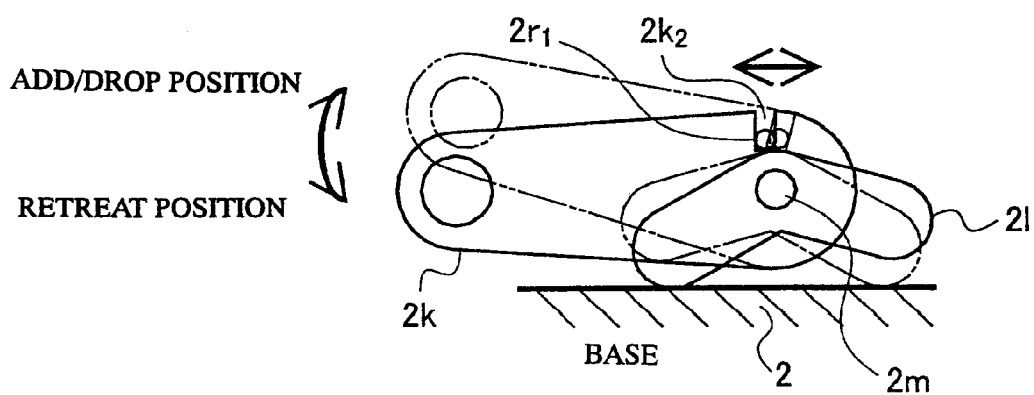
FIG. 10 is an explanatory view of the optical switch shown in FIG. 7 and FIG. 8.

FIG. 1 is a plan view showing a structure of an optical switch 200 according to the present embodiment; FIG. 2 is a perspective view showing an example of an optical switching portion 24; FIG. 3 is a view showing a concrete structure of an input light outputting collimator device 20; FIG. 4 is a perspective view showing a concrete structure of an optical switch according to an embodiment of the present invention; FIG. 5 is a plan view showing a concrete structure of the optical switch according to the embodiment of the present invention; FIG. 6 is a perspective view showing a transformed example of the optical switch shown in FIG. 5; FIG. 7 is a perspective view showing another concrete structure of the optical switch according to the embodiment of the present invention; FIG. 8 is a plan view of the optical switch shown in FIG. 7; FIG. 9 and FIG. 10 are explanatory views of the optical switch shown in FIG. 7 and FIG. 8; and FIG. 11 a view showing a structure of an optical add/drop multiplexer according to the embodiment of the present invention. The optical switch and the optical add/drop multiplexer according to the embodiment will be explained hereinafter with reference to the drawings.

As shown in FIG. 1, the optical switch according to the present embodiment includes an input light outputting collimator device 20 which collimates and outputs a light sent through an upstream side optical transmission line 20a constituted by an optical fiber or the like, and an output light inputting collimator device 21 which inputs the collimated light outputted from the input light outputting collimator device 20 at a position away for a predetermined distance and introduces and sends the collimated light to a downstream side optical transmission line 21a constituted by the optical fiber or the like, and furthermore, an optical switching portion 24 is retreatably disposed between the input light outputting collimator device 20 and the output light inputting collimator device 21.

The input light outputting collimator device 20 and the output light inputting collimator device 21 are disposed so that their output end face and input end face are opposed with each other having an optical axis in common with each other. Therefore, when the optical switching portion 24 is retreated from therebetween, the light outputted from the input light outputting collimator device 20 is straightly inputted to the output light inputting collimator device 21 to be transmitted.

The optical switching portion 24 is so structured that a drop light inputting collimator device 22 and an add light outputting collimator device 23 are mounted on a movable holding member 24a. When the optical switching portion 24 is disposed between the input light outputting collimator device 20 and the output light inputting collimator device 21, the drop light inputting collimator device 22 inputs the collimated light outputted from the input light outputting collimator device 20 and introduces the collimated light to a dropping transmission line 22a, to send the light to the outside. Besides, when the optical switching portion 24 is disposed between the input light outputting collimator device 20 and the output light inputting collimator device 21, the add light outputting collimator device 23 collimates and outputs a light sent from outside through an adding transmission line 23a, and inputs the collimated light to the output light inputting collimator device 21, to introduces to the downstream side optical transmission line 21a.

Here, optical fiber collimators are used for the input light outputting collimator device 20, the output light inputting collimator device 21, the drop light inputting collimator device 22, and the add light outputting collimator device 23. The optical fiber collimator has, for example, an optical output end or an optical input end of the optical fiber being an optical transmission line having an optical axis in common, and a collimate lens which makes the light outputted or inputted through the optical output end or the optical input end to be a collimated light or a convergence beam, in a cylindrical tube polished with high precision. A convex lens, an aspherical lens, a graded refractive index rod lens, and the like can be used for the collimate lens. A lens and a fiber may be held and fixed with an adhesive, or the lens may be fused and fixed to the fiber in a common glass tube or a stainless tube. The adhesive does not exist between the lens and the fiber in either case, and they are optically free and can correspond to high power.

FIG. 3 is a view showing a concrete structure of the input light outputting collimator device 20. In the input light outputting collimator device 20, an optical output end of the optical fiber 20a is fused and fixed to an aspherical lens 200c, and a output end portion of the optical fiber 20a is covered with a holding portion 20b and fixed with an adhesive in a stainless tube 200a.

Further, as another example of the optical fiber collimator, such an optical fiber collimator may be used that an optical fiber inserted to a cylindrical holding portion having substantially the same diameter as a gradient index lens being a collimate lens, and an oblique end face of a rod type gradient index lens of which end face is also formed obliquely, are faced with each other, and inserted to a cylindrical member made of a glass tube, stainless steel, or the like, and fined with an adhesive. Besides, a collimator using a fiber in which a coreless fiber having a specific length exists at the optical output end or the optical input end can be used. This collimator has such a characteristic that an output and/or input angle is small, and that a reflection loss is small. A collimator of this kind is commercially available, for example, from Lightpath Technologies, Inc (1.6 mm $\phi$, 7 mm long).

The optical switching portion 24 is, for example, as shown in FIG. 2, so structured that, in a V-shaped groove 24b formed on the movable holding member 24a, the drop light inputting collimator device 22 and the add light outputting collimator device 23 are disposed so that each end face of the optical input or output faces outward, and they are fixed and held to have an optical axis in common. The movable holding member 24a is movably formed at the spaced interval formed between the input light outputting collimator device 20 and the output light inputting collimator device 21 by a later-described drive mechanism, so that the following position of (A) and (B) can be switched.

(A) A first position (a position shown by a solid line in the drawing, hereinafter referred to as an add/drop position) so disposed that the add light outputting collimator device 23 and the drop light inputting collimator device 22 are disposed at a spaced interval formed between the input light outputting collimator device 20 and the output light inputting collimator device 21 in order to make such a disposition relationship that the input light outputting collimator device 20 and the drop light inputting collimator device 22 fixed on the movable holding member 24a are disposed to face each other, and that the add light outputting collimator device 23 fixed on the movable holding member 24a and the output light inputting collimator device 21 are disposed to face each other.

(B) A second position (a position shown by a dotted line in the drawing, hereinafter referred to as a retreat position) that the add light outputting collimator device 23 and the drop light inputting collimator device 22 are retreated out of the spaced interval formed between the input light outputting collimator device 20 and the output light inputting collimator device 21 so that the light outputted from the input light outputting collimator device 20 is not obstructed to input to the output light inputting collimator device 21.

In the case of the (A), the light outputted from the input light outputting collimator device 20 is inputted to the drop light inputting collimator device 22, and simultaneously the light outputted from the add light outputting collimator device 23 is inputted to the output light inputting collimator device 21. In other words, it becomes a state (hereinafter referred to as a state (ii)) that the light sent from the upstream side optical transmission line 20a is introduced to the dropping transmission line 22a, and that the light sent from the adding transmission line 23a is introduced to the downstream side optical transmission line 21a.

In the case of the (B), the light outputted from the input light outputting collimator device 20 is straightly inputted to the output light inputting collimator device 21. In other words, it becomes a state (hereinafter referred to as a state (i)) that the light transmitted through the upstream side optical transmission line 20a is straightly introduced to the downstream side optical transmission line 21a.

As described above, either the add/drop position of the (A) or the retreat position of the (B) is selected as a position of the movable holding member 24a, and thereby, a switching of the optical path of the light sent through the upstream side optical transmission line 20a and outputted from the input light outputting collimator device 20 is conducted.

Besides, as explained above, the retreat position of the movable holding member 24a may be the position which does not obstruct the optical path from the input light outputting collimator device 20 to the output light inputting collimator device 21. However, it is preferable if the optical axis of the add light outputting collimator device 23 and the drop light inputting collimator device 22 at the retreat position is placed to be in parallel with the optical axis of the input light outputting collimator device 20 and the output light inputting collimator device 21, and also, input/output ends of the input light outputting collimator device 20 and the drop light inputting collimator device 22 is placed to face each other, and input/output ends of the output light inputting collimator device 21 and the add light outputting collimator device 23 is placed to face each other, switching can be conducted by a simple parallel movement of the movable holding member 24a. When such the parallel movement is performed, any movement in a perpendicular direction (a vertical movement), in a parallel direction (a horizontal movement), and in a rotational direction is possible, relative to a substrate face of the movable holding member 24a.

In the aforementioned example, the drop light inputting collimator device 22 and the add light outputting collimator device 23 are fixed on the V-shaped groove 24b of the movable holding member 24a, however, if the input light outputting collimator device 20 and the output light inputting collimator device 21 are also fixed on a V-shaped groove having an axis of a groove in common, optical axis adjustment thereof can be further facilitated. Consequently, the add light outputting collimator device 23 and the drop light inputting collimator device 22 can be set or out of the predetermined position within the predetermined spaced interval formed between the input light outputting collimator device 20 and the output light inputting collimator device 21, by just moving and adjusting the position of the movable holding member 24a, and the switching, between the above-stated state (i) and the state (ii) becomes possible.

The movable holding member 24a can take any shape and be made of any material as long as it fixes the add light outputting collimator device 23 and the drop light inputting collimator device 22 in a predetermined positional relationship, but use of a substrate-type material facilitates its handling. As a material thereof, a metal such as glass or aluminum, silicon, and resin, can be used. Besides, as described above, the movable holding member 24a has the V-shaped groove, and thereby, a position adjustment of the add light outputting collimator device 23 and the drop light inputting collimator device 22 fixed thereon becomes easy. This V-shaped groove can be formed by a cutting machining of a substrate, or by copying a shape of a die by way of a press forming if the substrate is made of glass.

It should be noted that UV cure adhesive, a heat curing adhesive, solder, welding, or the like can be appropriately used to fix parts.

As explained above, the optical switch according to the present embodiment conducts switching by moving the movable holding member 24a to move the drop light inputting collimator device 22 and the add light outputting collimator device 23 fixed on the movable holding member 24a, and a catoptric system is not used at all. Consequently, the problems of the loss due to reflection and the PDL do not occur at all. Further, the number of the parts can be reduced because a prism or a reflector is not necessary, which allows to reduce the cost. Furthermore, only position adjustment between the respective optical fiber collimators is required, and use of only linear disposition is possible, allowing extremely easy position adjustment between the parts.

Next, a concrete structure of the optical switch according to the embodiment of the present invention will be explained with reference to FIG. 4 and FIG. 5. In these drawings, a numeral 2 represents a substantially U-shaped base. The base 2 has two mounting plate portions 2a and 2b provided to face each other, and the input light outputting collimator device 20 and the output light inputting collimator device 21 are fixed therethrough. A substantially U-shaped movable table 2c movably disposed is provided in the base 2. The add light outputting collimator device 23 and the drop light inputting collimator device 22 are attached to the movable table 2c having the optical axis in common, and thereby, the optical switching portion 24 is configured. The movable table 2c is fixed on a slider 2e slidably mounted on a rail 2d. The rail 2d is provided so that the slider 2e is movable in an orthogonal direction to the optical axis of the input light outputting collimator device 20 and the output light inputting collimator device 21. The movable range of the slider 2e is controlled by stoppers 2g and 2f. The slider 2e can be moved by driving a drive shaft 2h, which is inserted and fixed in the movable table 2c, with a linear actuator 2i.

Consequently, the optical switching portion 24 can be disposed retreatably between the input light outputting collimator device 20 and the output light inputting collimator device 21.

Incidentally, as shown in FIG. 6, a movable table 2*j* to which the drop light inputting collimator device 22 and the add light outputting collimator device 23 are disposed and fixed on the V-shaped groove can be used, instead of the substantially U-shaped movable table 2*c*.

Next, another concrete example of the optical switch according to the embodiment of the present invention will be explained with reference to FIG. 7 to FIG. 10. In this example, the drop light inputting collimator device 22 and the add light outputting collimator device 23 are respectively inserted to fix through mounting holes 2*k*1 at tip portions of two lever-shaped collimator holders 2*k* whose base end portions are attached to a rotation shaft 2*m*. The collimator holders 2*k* are rotationally driven by using the rotation shaft 2*m* as a rotation shaft, and thereby, the optical switching portion 24 is retreatably disposed between the input light outputting collimator device 20 and the output light inputting collimator device 21 respectively fixed through facing mounting plate portions of the substantially U-shaped base 2.

The rotation shaft 2*m* is rotationally supported by shaft receiving members 2*n* by disposing both end portions thereof in V-shaped shaft receiving portions of two shaft receiving members 2*n*, and by fixing metal strips 2*p* by screws 2*q*. The control of the rotation range is conducted by a substantially dogleg-shaped stopper 21 fixed through a center portion of the rotation shaft 2*m*. Rotation drive is conducted by inserting a drive pin 2*r*1 of a solenoid 2*r* in cutout portions 21E2 provided on upper portions of the base end portions of the collimator holders 2*k*, and by driving the drive pin 2*r*1 in a substantially horizontal direction. In other words, as shown in FIG. 10, when the drive pin 2*r*1 is moved horizontally in the drawing, the collimator holder 2*k* rotates by using the rotation shaft 2*m* as a center, and thereby, the drop light inputting collimator device 22 and the add light outputting collimator device 23 inserted in the tip portion of the collimator holder 2*k* moves vertically. The movable range is controlled by the stopper 21; and therefore, the optical switching portion 24 composed of the drop light inputting collimator device 22 and the add light outputting collimator device 23 can be moved from the retreat position to the add/drop position with no restriction by appropriately selecting a shape of the stopper 21.

Incidentally, as a method for supporting the rotation shaft 2*m*, bearings can be used in addition to the holding by the V-shaped grooves provided on the shaft receiving members 2*n* and the metal strips 2*p*, which is described above. In this case, circle holes are made on the shaft receiving members 2*n* instead of the V-shaped grooves, and two bearings (for example, manufactured by NSK Ltd., outside diameter 4 mm, inside diameter 2 mm) are inserted therein. The rotation shaft is inserted and fixed in the respective through holes so that the stopper is disposed inside and that the collimator holders are disposed outside relative to the bearings, and thereby the insertable and retreatable optical switching portion 24 can be obtained.

Incidentally, as the drive mechanism of the optical switching portion 24, a moving mechanism for general use can be appropriately used in addition to the aforementioned drive mechanism. For example, a micromotor or a linear actuator can be used.

Further, a method for providing a magnetic substance on the movable holding member to move the magnetic substance by a magnetic force generated by a magnet disposed outside can be used. In this case, a movable fixing member itself may be formed by a magnetic substance material.

As still another method, there is a method for moving the movable fixing member between the add/drop position and the retreat position by using a ball screw or the like.

Besides, a solenoid is used as the drive mechanism and a magnet is used as a positioning stopper, of, the like, and thereby, a latching type (a self holding type) optical switch not requiring for constant energization is made possible, then a generation of chattering can be restrained when the stopper is in contact.

Further, by using damping alloys as a part of the members, the generation of chattering is restrained when the stopper is in contact with a base. For example, the members can be obtained by inserting and fixing the damping alloys (manufactured by Seishin Co., Ltd., 5×5 mm, 1 mm in thickness) to the base. As described above, the members may be thus inserted to a base portion being in contact with the stopper, or used as a stopper which positions the movable holding member.

Further, as optical fiber collimators used for the input light outputting collimator device 20 and the like, the collimators of which the lens, the fiber, and so on, are inserted to a cylindrical member such as glass, stainless steel, and fixed with an adhesive are used, and therefore, the adjustment of the optical axis becomes easy by fixing them on a V-shaped groove formed on a common positioning member in advance.

Figure 11:
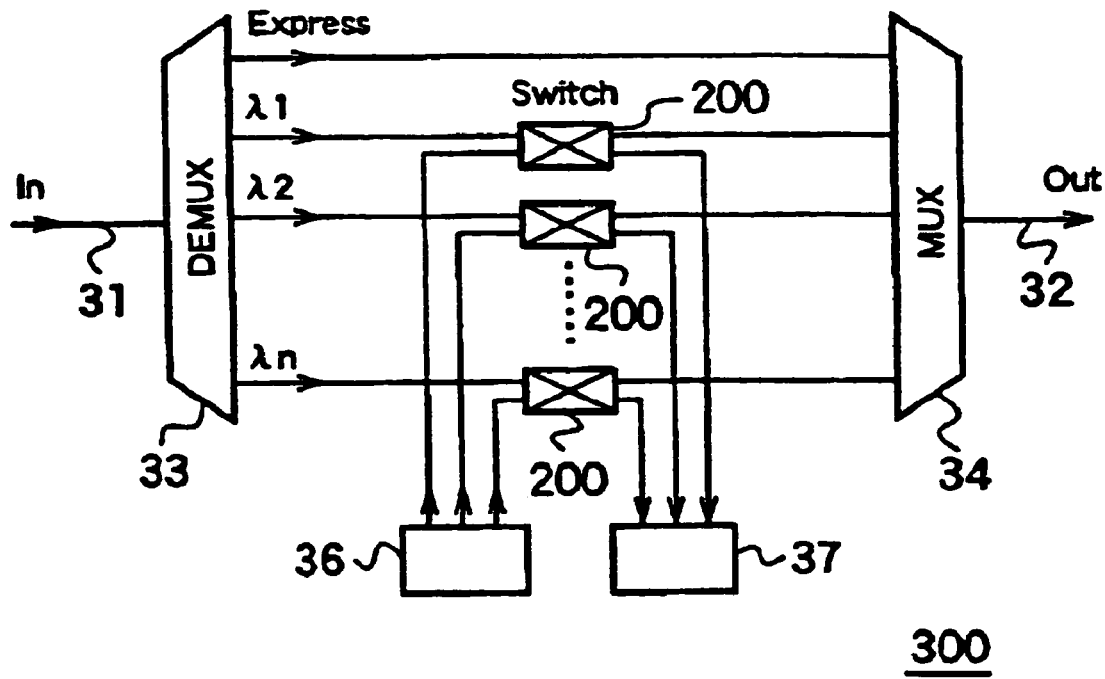
FIG. 11 is a view showing a structure of an optical add/drop multiplexer according to the embodiment of the present invention.
Figure 12:
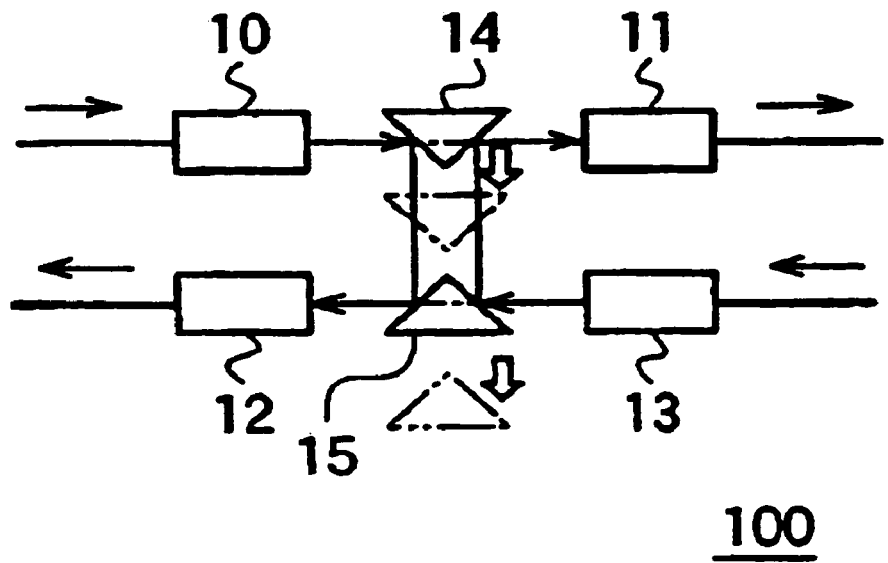
FIG. 12 is a view showing a conventional two by two channel optical switch.

Next, an optical add/drop multiplexer using the optical switch of the present embodiment will be explained. FIG. 11 is a schematic view showing an optical add/drop multiplexer 300 using the optical switch of the present embodiment. The optical add/drop multiplexer 300 of the present embodiment has an optical demultiplexer 33 which demultiplexes a multiple wavelength light transmitted from an optical transmission line 31 into signal lights of respective wavelengths, and an optical multiplexer 34 which multiplexes the signal lights demultiplexed into the respective wavelengths and then resends the signal light to an optical transmission line 32, and includes plural two by two channel optical switches 200 of the present invention therebetween so as to correspond to the signal lights of the respective wavelengths.

As described above, the optical switch has a function to select either to transmit the demultiplexed signal lights straight to the optical multiplexer 34 side (the state (i)) or to drop, the demultiplexed signal lights to a receiver 37 at a repeater station and add the signal lights sent from a transmitter 36 at the repeater station to the optical multiplexer 34 side (the state (ii)). As the optical demultiplexer 33, any optical demultiplexer is acceptable as long as it has a function to demultiplex the multiple wavelength light into lights of the respective wavelengths. For example, such a device as disclosed in Japanese Patent Laid-open No. Hei 11-337765 is the one which includes plural wavelength selection filters which transmit only a light of a specific wavelength band area and reflect lights of other wavelengths and which demultiplexes the multiple wavelength light inputted from the optical transmission line 31 into respective wavelengths by sequentially passing through the wavelength selection filters having different transmission wavelengths.

As a wavelength selection filter, a filter in which dielectric multilayered films are formed on a substrate, an optical fiber grating in which diffraction grating is formed in an optical fiber, and so on, can be used. As another optical demultiplexer 33, as described in Japanese Patent No. 2599786 an arrayed optical waveguide diffraction grating which forms plural optical waveguides having different length of optical paths on the substrate to demultiplex the multiple wavelength light to the respective wavelengths can be used.

Further, as the optical multiplexer 34, the same type as the aforementioned optical demultiplexer can be used. The signal lights of the respective wavelengths demultiplexed by the optical demultiplexer 33 are introduced by the optical switches 200 of the present invention provided in accordance with the respective signal lights, and the optical path is determined either to be dropped, to the repeater station or to be transmitted straightly according to a selected status of the optical switches 200. The lights transmitted straightly are multiplexed to the signal lights of the other wavelengths at the optical multiplexer 34. The lights dropped to the repeater station are received by the receiver 37 of the repeater station and utilized. Further, the signal lights sent from the transmitter 36 of the repeater station are multiplexed with the signal lights of the other wavelengths at the optical multiplexer 34 via the optical switches 200 and sent to the optical transmission line 32. The adding/dropping of the multiple wavelength light is conducted as described above.

The optical add/drop multiplexer 300 in the present embodiment uses the optical switch according to the present invention which does not use a catoptric system, and therefore, it is possible to conduct an optical communication of high quality without having problems of the loss due to reflection and the PLC Besides, the optical switch being used in the present invention can reduce the number of parts; moreover, cost reduction is possible because position adjustment between the parts is extremely easy, and as a result, a cost reduction of the overall optical add/drop multiplexer becomes possible.

What is claimed is:

1. An optical switch, provided in a middle of an optical transmission line, for switching between a case when a light sent through the optical transmission line is straightly transmitted, and a case when the light sent through the optical transmission line is transmitted to an outside location and the light from the outside location is introduced to the optical transmission line, the optical switch comprising:
   an input light emitting collimator device which extracts the light sent through the optical transmission line from an end face of an optical fiber of the optical transmission line on the upstream side, then, collimates and emits the light thus extracted;
   an output light receiving collimator device which receives the collimated light emitted from the input light emitting collimator device which is located a predetermined distance therefrom, and introduces the collimated light to the optical transmission line from the end face of the optical fiber of the optical transmission line on the downstream side; and
   a light switching part retractably arranged between the input light emitting collimator device and the output light receiving collimator device, wherein the light switching part includes:
      a drop light receiving collimator device which receives the collimated light emitted from the input light emitting collimator device, introduces the collimated light from the end face of the optical fiber of a dropping transmission line to the dropping transmission line, and sends the collimated light to the outside location when the light switching part is arranged between the input emitting collimator device and the output light receiving collimator device; and
      an add light emitting collimator device which extracts light sent from an outside location through an adding transmission line from the end face of the optical fiber of the adding transmission line, collimates the light, and emits the collimated light to the output light receiving collimator device, which introduces the collimated light to the optical transmission line when the light switching part is arranged between the input light emitting collimator device and the output light receiving collimator device.

2. The optical switch according to claim 1, wherein the input light emitting collimator device, the output light receiving collimator device, the drop light receiving collimator device and the add light emitting collimator device are optical fiber collimator devices.

3. The optical switch according to claim 2, wherein said optical fiber collimator devices use optical fiber having coreless fiber that exists on an optical emitting end or optical receiving end of said optical fiber, as said optical fiber.

4. An optical add/drop multiplexer, comprising:
   an optical demultiplexer which demultiplexes a multiple wavelength light transmitted from the optical transmission line into a plurality of signal lights, wherein each signal light is of a respective wavelength;
   the optical switch according to claim 1, being provided for each signal light of the respective wavelength demultiplexed by the optical demultiplexer, which switches an optical path of the signal light of the respective wavelength to either
      (a) straightly transmit the signal light to the optical transmission line without dropping the signal light to a repeater station to the optical transmission line; and
      (b) drop the signal light to the repeater station and add a signal light transmitted from the repeater station to the optical transmission line; and
   a light multiplexer which multiplexes the signal lights, each of which is either straightly transmitted or added to the optical transmission line, to obtain a multiple wavelength light.

5. The optical add/drop multiplexer according to claim 4, wherein the input light emitting collimator device, the output light receiving collimator device, the drop light receiving collimator device and the add light emitting collimator device are optical fiber collimator devices.

6. The optical add/drop multiplexer according to claim 5, wherein said optical fiber collimator devices use optical fiber having coreless fiber that exists on an optical emitting end or optical receiving end of said optical fiber, as said optical fiber.

* * * * *